United States Patent [19]

Bjerk

[11] Patent Number: 5,100,279
[45] Date of Patent: Mar. 31, 1992

[54] MATERIAL HANDLING APPARATUS
[75] Inventor: Gary E. Bjerk, Longmont, Colo.
[73] Assignee: JCI, Inc., Denver, Colo.
[21] Appl. No.: 585,405
[22] Filed: Sep. 20, 1990
[51] Int. Cl.$^5$ .............................................. B60P 1/64
[52] U.S. Cl. .......................... 414/421; 298/23 MD; 298/23 G; 298/23 D; 298/22 B; 414/491; 414/498; 414/546
[58] Field of Search ............... 414/421, 498, 546, 555, 414/491, 419, 420; 298/23 MD, 23 M, 23 S, 23 D, 22 B

[56] References Cited
U.S. PATENT DOCUMENTS

| | | | |
|---|---|---|---|
| 2,264,216 | 11/1941 | Milligan | 414/491 |
| 2,350,488 | 6/1944 | Barrett | 298/23 D X |
| 3,355,043 | 11/1967 | Talbert | 414/498 X |
| 3,905,498 | 9/1975 | van der Lely | 414/498 X |
| 4,068,892 | 1/1978 | Welch | 298/23 D X |
| 4,132,325 | 1/1979 | Corompt | 414/498 |
| 4,175,904 | 11/1979 | Airaksinen | 414/421 |
| 4,618,307 | 10/1986 | Kress et al. | 414/498 |

FOREIGN PATENT DOCUMENTS

| | | | |
|---|---|---|---|
| 913876 | 5/1954 | Fed. Rep. of Germany | 298/23 MD |
| 9354 | 1/1986 | Japan | 414/498 |
| 67641 | 4/1986 | Japan | 414/498 |

Primary Examiner—David A. Bucci
Attorney, Agent, or Firm—Timothy J. Martin; Dana S. Rewoldt

[57] ABSTRACT

A material handling apparatus includes a tractor/trailer vehicle which can mount and dismount ore receiving containers, which can transport the containers between a collection site and a deposit site and which can dump ore out of a container at the deposit site. Each container defines a housing with an interior and an open rear area. A tailgate assembly includes a pair of bell crank arms pivotally secured on either side of the container and a tailgate mounted between first arm portions thereof to close the open rear area. A transport frame, preferable on the trailer section of the tractor/trailer vehicle, defines a support for a tiltable bed pivoted mounted on a rear portion of the frame. A linkage assembly is centrally mounted on each side of the tiltable bed and each linkage assembly includes a cam member driven by a pair of first hydraulic cylinders. Actuation of these cylinders first causes the cam members to act against second arm portions of the bell crank arms to raise the tailgate after which, and upon abutment with a limit stop block, continued actuation tilts the bed to dump ore out of the container. A hydraulically actuated lift arm is used to mount and dismount each container from the trailer section.

26 Claims, 7 Drawing Sheets

MATERIAL HANDLING APPARATUS

FIELD OF THE INVENTION

The present invention concerns material handling apparatus operative to receive material at a collection site, to transport the material to a deposit site and to dump the material at the deposit site. The present invention is especially directed to ore moving equipment which may be used in mining operations. As such, the present invention is directed to a combination tractor/trailer vehicle which has the ability to mount and dismount independent ore carrying containers and which has the ability to dump material from a container while the container is mounted on the tractor/trailer vehicle.

BACKGROUND OF THE INVENTION

The handling of material, including the collection, transport and deposit of the same, is of great concern to virtually all industrialized cultures. Surface transport of materials is largely accomplished by trucking, shipping and rail systems. Particular problems confront the underground mining industry, though, regardless of whether the industry concerns the mining of coal, hard rock mining (for metal bearing ores or other minerals) or for other substances. Problems peculiar to this industry include the narrow confines of an underground mine, the length of time necessary to load a container of material and the substantial weight of most mineral bearing ores.

In the early days of underground mining, material was cut from the underground strata and conveyed to the surface by human porter or by pack animals. In some instances, mechanical advantage was gained by rope and pulley systems which were used to draw wheeled carts or buckets of material to the surface of the mine. Later, with the advent of rail technology, underground mines were often provided with specially constructed railway track systems onto which ore cars could travel with motive power being provided by draft animals, by engines or by electrical motor devices.

These earlier systems, while each normally representing an advancement over its predecessor systems, nonetheless had obvious disadvantages. On the one hand, manual or animal driven systems were labor intensive and were inefficient in removing large quantities of ore from the underground mining operation. On the other hand, rail systems typically required the construction of many miles of track between collection sites and deposit sites, which was quite expensive, or required extra unloading and loading operations. In any event, the track systems further reduced the working area in the narrow confines of a mine since the track systems required a dedicated surface area for installation.

In an effort to further improve material handling systems, some mines utilize special ore carrying vehicles which may be parked at a collection site and, after being filled with the mined material, may be driven to a deposit site, such as a processing plant or materials storage site where a inventory of ore may be collected. The disadvantage of this system resides in the fact that, while being filled with material at the collection site, the transport vehicle is out of service. Where independent tractor/trailer vehicles are employed, the coupling and decoupling of the tractor/trailer vehicles is time consuming and usually requires several worker at a time. Such equipment, by its very nature, is capital intensive.

Accordingly, it is more desirable to employ a plurality of ore receptacles or containers for each combination tractor/trailer vehicle with these containers being simplified housing structures as opposed to complete wheeled trailer vehicles. In such a system, a single tractor vehicle may be used to distribute various containers throughout an underground mining operation and, as each container is filled, the tractor vehicle may retrieve the container, transport the container to a deposit site, dump the material from the container and return it once again to the collection site. A single tractor vehicle thus service a number of containers and collection sites in an efficient manner. This type of system is not without its own problems. In order to accommodate any reasonable period of mining at the collection site, the ore containers must be of sufficient size to hold a substantial volume of mined ore. This creates two problems. First, an increase in size of the container normally makes it more difficult for the tractor and container to maneuver in the narrow confines of the mine. Second, since most ore bearing materials are extremely heavy, any container of suitable volume, when full, is extremely heavy. As a result, the loading apparatus used to move a container from a collection site onto the tractot/trailer vehicle and to thereafter dump the material from the container has heretofore been relatively elaborate which increases the capital expense of the equipment as well as increasing cost due to maintenance costs and lost time due to break downs. Accordingly, there remains a need for improved material handling apparatus which is simplified in construction, which can haul heavy loads and which is highly maneuverable in confined spaces.

SUMMARY OF THE INVENTION

One object of the present invention is to provide a new and useful material handling system wherein a container may be associated with a transport frame, either as an independent container or constructed as part of the transport frame, and which has a simplified assembly for dumping the contents of the container at a desired deposit site.

Another object of the present invention is to provide a materials handling system wherein a plurality of containers may be distributed to different collection points and may be serviced by a single tractor/trailer vehicle that is simplified in construction yet which can handlle extremely heavy loads.

A further object of the present invention is to provide ore handling equipment for underground mining, which can efficiently remove ore that is extracted from a mine, transport the ore to the surface and dump the ore at a selected deposit site in an efficient manner.

Still a further object of the present invention is to provide a tractor/trailer combination for servicing a plurality of containers adapted to receive ore in an underground mining operation wherein the tractor/trailer combination is highly maneuverable within the narrow confines of the mine.

Yet another object of the present invention is to provide a simplified combination tractor/trailer vehicle and container structure wherein a single operator can retrieve ore filled containers from an underground mine and transport to and dump the material from the containers at a desired deposit site and return the containers to the collection sites without requiring the services of additional workers.

According to the broad form of the present invention, then, a material handling apparatus is provided, and this apparatus is adapted to collect material at a collection site, transport the material to a deposit site and dump the material at the deposit site. In its broad form, the present invention comprises a transport frame that includes a support frame and a tiltable bed pivotally connected to the support frame along a bed axis. A container is associated with the tiltable bed with the container defining a housing structure having a bottom wall, a pair of sidewalls, a front wall and an open rear area that together form a storage region for receiving material. The container includes a tailgate assembly constructed as a pair of bell crank arms each having first and second arm portions pivotally journaled to the housing structure on an arm axis. A tailgate is mounted between the first arm portions, and an actuator structure is provided to operate the bell crank arms to tilt the tiltable bed between a transport position for transporting the material and a dump position for dumping the material at deposit site. The tailgate is correspondingly pivoted between a closed position wherein the tailgate extends against and thereby closes the open rear area of the container housing structure and an open position wherein the tailgate is moved away from and thereby opens the open rear area of the container housing structure. The actuator, when operated, thus first moves the tailgate structure to an open position, and the actuator includes a first limit stop for limiting pivotal movement of the second arm portions at a firt stop point whereby continued application of force by the actuator causes the tiltable bed to pivot about the bed axis thereby tilting the bed from the transport position to the dump position. Means is also provided for moving the transport frame between the collection site and the deposit site.

In the preferred form of the present invention, the container is independent of the tiltable bed so that the container may be removed from the support frame and place at the collection point. To this end, the material handling apparatus includes a lift arm for removing and retrieving the container from the collection point. This lift arm also acts to retain the container on the tiltable bed during a dumping operation. The container is provided with a transverse bar as a means for engaging a hook portion of the lift arm. The lift arm includes an actuator that pivots the lift arm between a retracted position, corresponding to the transport position, and an extended position wherein the free end of the lift arm, which terminates in a hook portion, will engage the transverse bar on the container. When the lift arm moves from the extended position to the retracted position, the lift arm lifts the container up and onto the tiltable bed. A support wheel may be provided at a trailing portion of the container when the container is being retrieved, and a leading portion of the container is configured to have a recess that receives the lift arm in the transport position.

Both of the actuators are preferable hydraulic cylinders, and the tiltable bed is preferably driven by a pair of hydraulic cylinders on either side thereof. These cylinders may be connected, at one end, to the support frame, and at the other end, to a linkage assembly including a cam member that is rotatably journaled to the support frame on a cam axis. The hydraulic cylinders then operate to rotate each cam member so that an attack portion of the cam member contacts a second arm portion of the respective bell crank arm whereby rotation of the cam members pivots the bell crank arm to move the tailgate assembly into the open position. In this configuration, a block element is mounted to the support frame on either side thereof to define the limit stop preventing rotation of the cam members by abutment of the cam members with the block element. A second limit stop may be provided for each cam member to limit rotation of the cam member at a second limit stop so that the cam members may be rotated only between the first and second limit stop points. This limit stop can be provided by a single block element where the extends partially around the respective cam axis. To this end also, the cam members are preferably C-shaped in configuration and has a first cam leg rotatably journaled to the support frame, a second cam leg having a free end defining the attack portion and a central cam portion interconnecting the first and second cam legs. A follower wheel is provided on the free end of each second cam leg to contact the second arm portion of the respective bell crank arm, and to this end, also, the second bell crank arms may include an arcuate recess portion which engage the follower wheel of the associated cam member.

In the exemplary embodiment of this invention, the means for moving the transport frame between the collection site and the deposit is provided by a tractor vehicle, with the transport frame being constructed as a trailer vehicle that is releasably secured to the tractor vehicle by means of mounts oriented on a vertical pivot axis. A single tractor and trailer combination may service a plurality of containers so that the containers may be distributed throughout an underground mine, for example. Workers may then fill the storage regions of the containers with material. The tractor and trailer vehicle may circulate through the mine to collect and convey the various containers, one by one, to a deposit site. Thus, the use of a single tractor/trailer vehicle with a plurality of containers leads to substantial efficiencies.

These and other objects of the present invention will become more readily appreciated and understood from a consideration of the following detailed description of the preferred embodiment when taken together with the accompanying drawings, in which:

DETAILED DESCRIPTION OF THE EXEMPLARY EMBODIMENT

The present invention is directed to a material handling apparatus generally, and is specifically directed to material handling apparatus which may be used to collect material from a collection site, transport the collected material to a deposit site and dump the material at the deposit site. In the exemplary embodiment described below, this invention is described particularly with respect ore handling machinery for use especially in underground mining operations. However, it should be understood that the principles described with respect to the transport frame and tiltable bed structure may be incorporated into other material handling devices.

Figure 1:
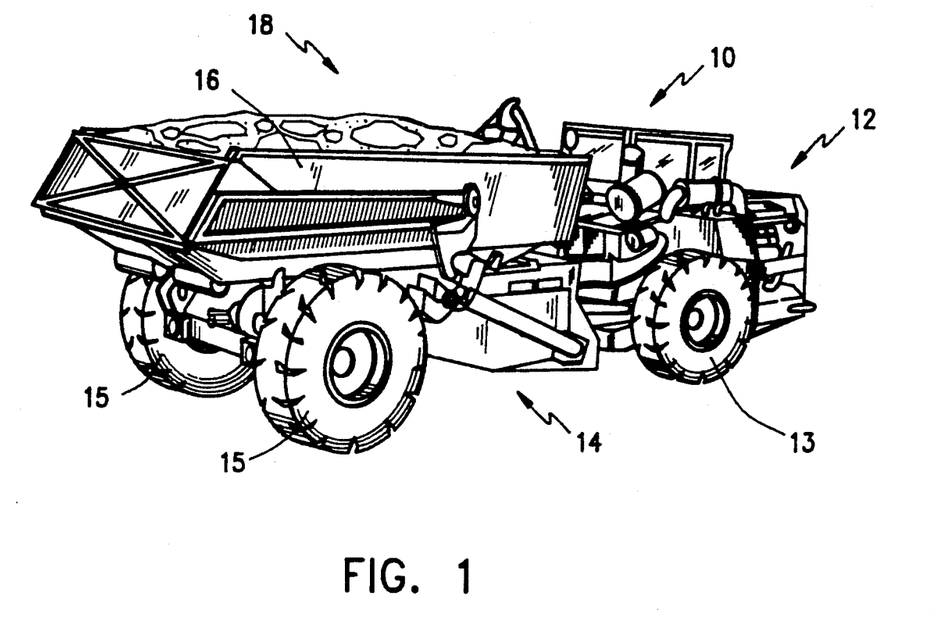
FIG. 1 is a perspective view of a material handling apparatus according to the exemplary embodiment of the present invention showing the transport of material in a container oriented in the transport position.

Turning, then, to the exemplary embodiment, it may be seen in FIG. 1 that a material handling apparatus 10 includes a tractor vehicle 12, a trailer vehicle 14 and a container 16 which is supported in a transport position on trailer 14. Container 16 contains material 18 which may be, for example, ore, gravel or other material to be handled (hereinafter sometimes referred to as "ore"). Tractor vehicle 12 is of any general type known in the mining art, although trailer vehicle 14 and container 16 are constructed according to the teachings of the present invention. Tractor vehicle 12 is provided with a pair of wheels 13 and trailer vehicle 14 is provided with a pair of wheels 15 to support the connected tractor and trailer assembly.

Figure 2:
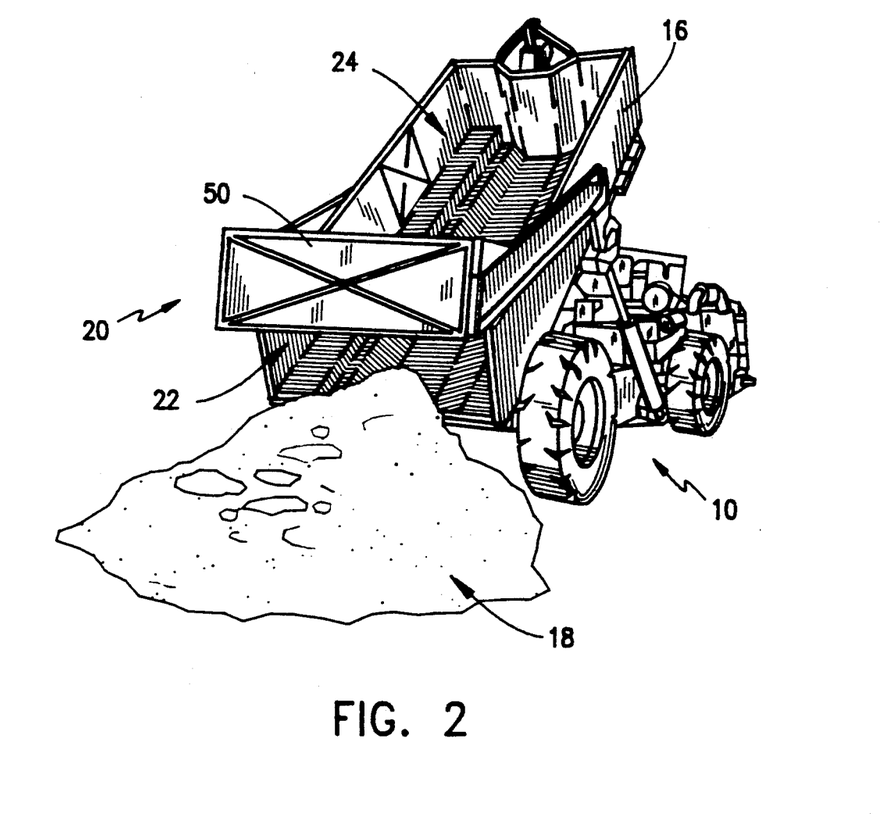
FIG. 2 is a perspective view of the material handling apparatus of FIG. 1 showing in a dump position for dumping material at a deposit site.

As described more thoroughly below, trailer vehicle 14 includes a transport frame and a tiltable bed so that the tiltable bed and the container 16 may be moved into a dump position, as is shown in FIG. 2. Here, it may be seen that container 16 is provided with a tailgate assembly 20 which is movable between an open position shown in FIG. 2 to a closed position, wherein an open rear area 22 at the trailing portion of container 16 is closed. As described below, container 16 has an interior storage region 24 which receives ore 18 but, as should be readily appreciated, when container 16 is moved to the dump position of FIG. 2, tailgate assembly 20 is raised so that ore 18 is dumped out of container 16 at the selected deposit site.

Figure 3:
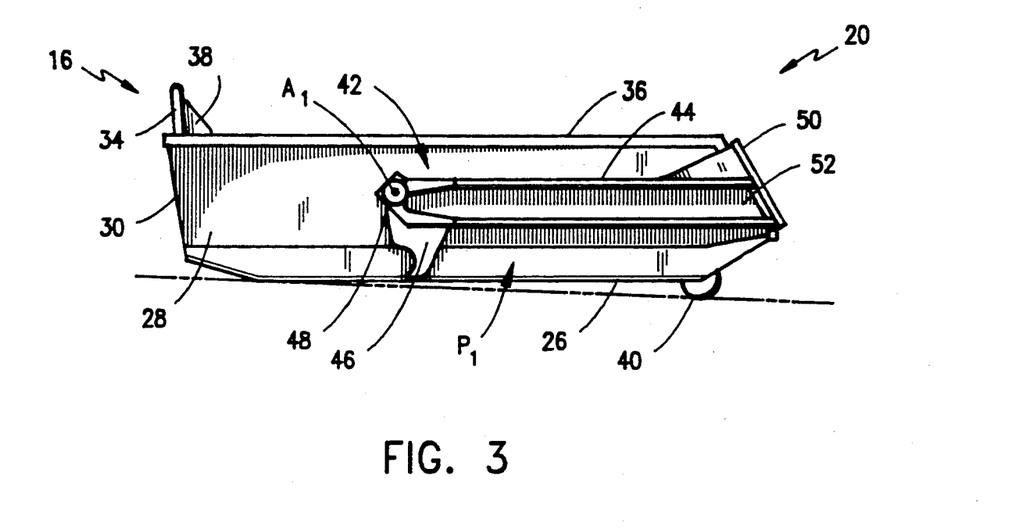
FIG. 3 is a side view in elevation of the independent container structure used with the material handling apparatus of FIGS. 1 and 2.
Figure 4:
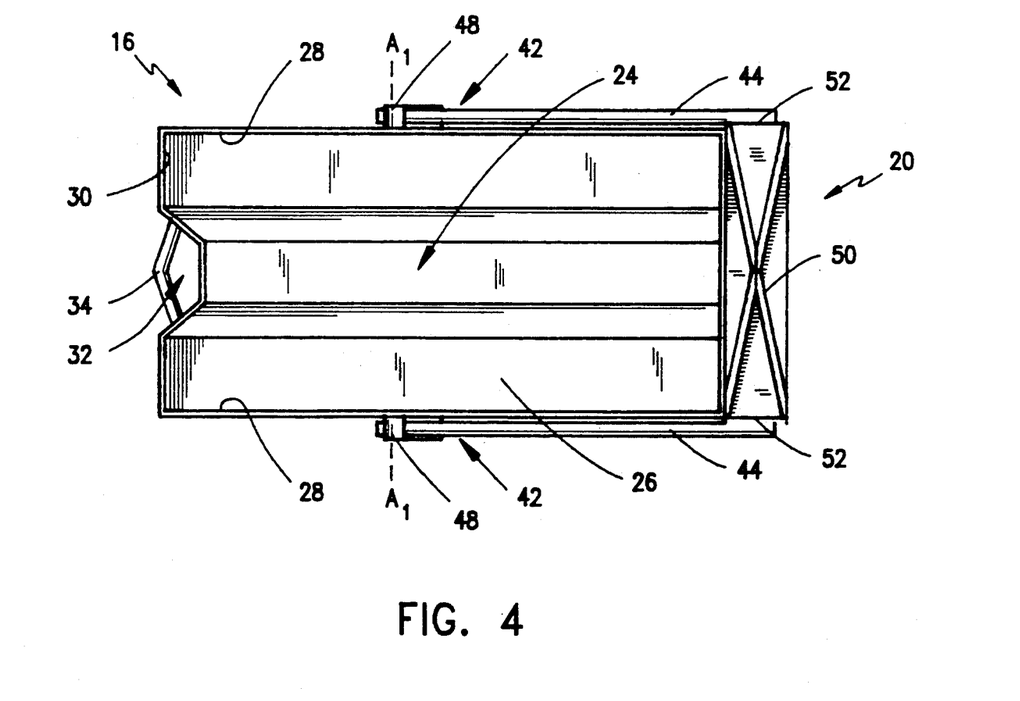
FIG. 4 is a top plan view of the container shown in FIG. 3.

Container 16 is an independent structure which may be selectively removed and retrieved from trailer vehicle 14, and the structure of container 16 is further shown in FIGS. 3 and 4. In these figures, container 16 defines a housing structure having a bottom wall 26, a pair of sidewalls 28, a front wall 30 and an open rear area 22 (noted above in FIG. 2) which together form storage region 24. Front wall 30 is located at a leading portion of container 16 and includes a recess 32. A bar 34 bridges across recess 32 transversely of the longitudinal axis of container 16, and, as is shown in FIG. 3 it may also be seen that transverse bar 34 extends above over the plane defined by edge 36 of container 16, and bar 34 is braced by means of brace elements 38. A trailing portion of container 16 is provided with a support wheel 40 which is rotatably journaled on bottom wall 26 centrally and rearwardly thereof.

Tailgate assembly 20 includes a pair of bell crank arms 42 with each bell crank arm having a first arm portion 44 and a second arm portion 46 which are oriented generally at right angles with respect to one another. Each bell crank arm 42 is pivotally journaled to the housing structure of container 16 on an arm axis $A_1$. To this end, trunnion and bearing assemblies 48 mount respective bell crank arms 42 at a location proximate the location of first and second arm portions 44 and 46. A tailgate 50 is mounted between end portions 52 of second arm portions 46 so that it may move between the closed position shown in FIGS. 3 and 4 and the open position shown in FIG. 2 when bell crank arms 42 are pivoted in a direction shown by arrow $P_1$ in FIG. 3.

Figure 7:
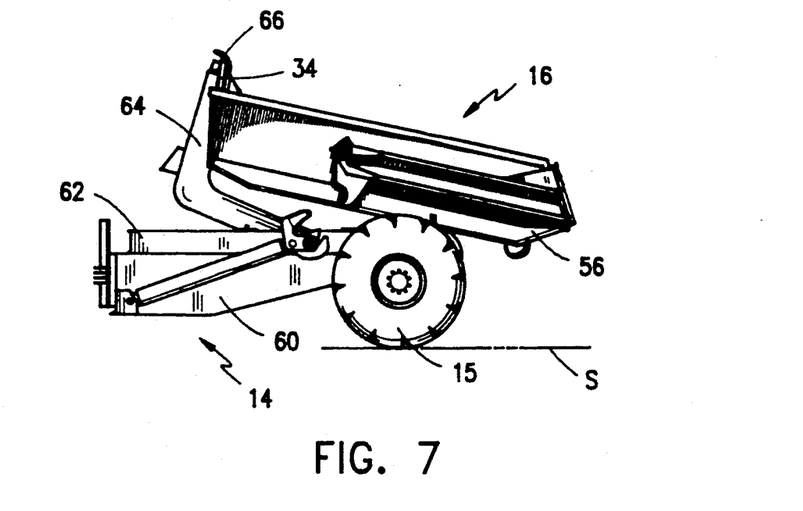
FIG. 7 is a side view in elevation showing a second intermediate position for the retrieval of a container at the collection site.

Reference may now be made to FIGS. 5-8 to show the loading of a container 16 onto trailer vehicle 14. As described in greater detail below, trailer vehicle 14 includes a transport or support frame 60 onto which is pivotally mounted a tiltable bed 62. An L-shaped lift arm 64 is pivotally journaled to bed 62 so that it may move between a fully extended position, shown in FIG. 5 to a fully retracted position shown in FIG. 8. Lift arm 64 terminates in a hook portion 66 which, in the extended position, is configured to engage transverse bar 34. When lift arm 64 is moved toward the retracted position, the leading portion 54 of container 16 is lifted upwardly and forwardly over trailing portion 58 of trailer vehicle 14. Trailing portion 56 of container 16 rides on support wheel 40 which rolls over surface S during this forward movement. As may be seen in FIG. 6, then, container 16 is in an intermediate retrieval position. Continued retraction of lift arm 64 wrests container 16 onto bed 62 so that, as is shown in FIG. 7, trailing portion 56 of container 16 is elevated above surface S. Continued retraction of lift arm 64 to the fully retracted position, shown in FIG. 8, to position container 16 in position for transport. Lift arm 64 is provided with a support block 68 which rests on a portion of bed 62 and further acts as a limit stop for the retracted position of lift arm 64.

Figure 5:
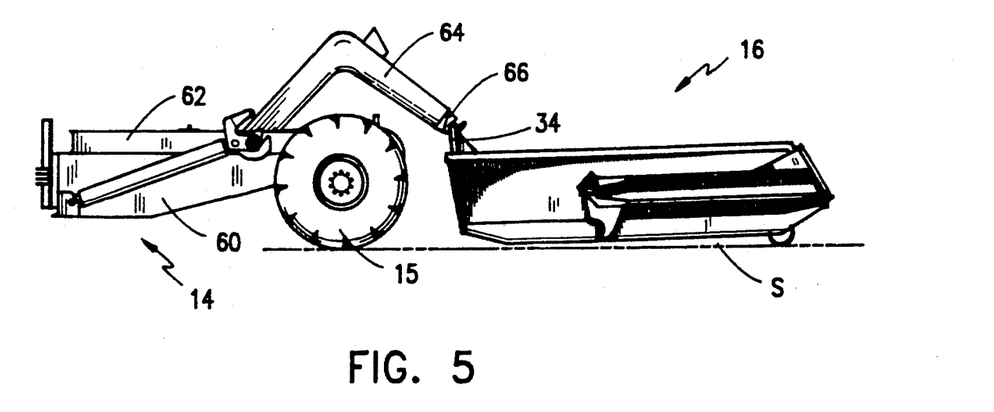
FIG. 5 is a side view in elevation showing the initial engagement of the trailer vehicle with a container at a collection site.
Figure 6:
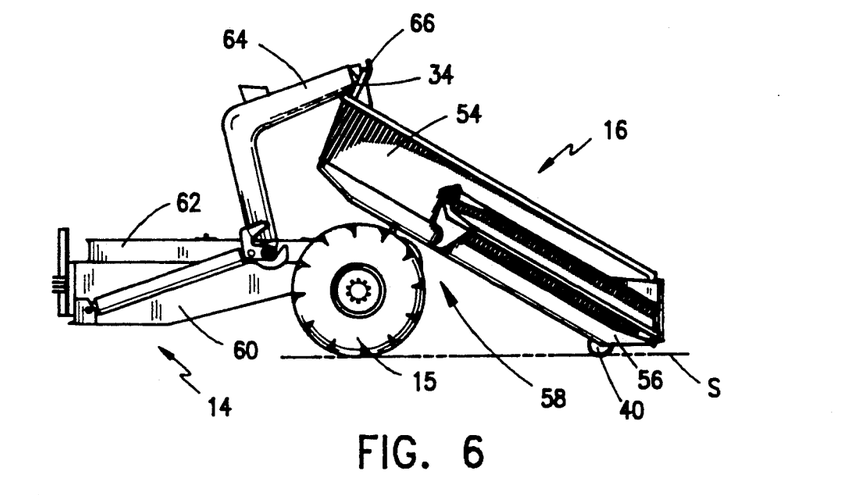
FIG. 6 is a side view in elevation showing a first intermediate position for the retrieval of container at the collection site.
Figure 8:
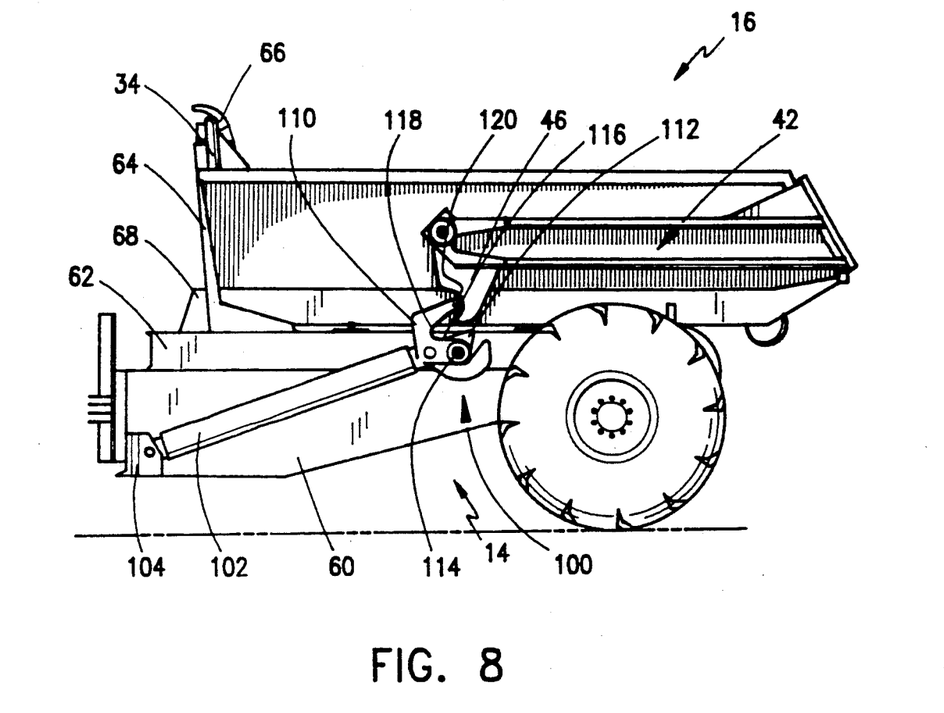
FIG. 8 is an enlarged side view in elevation showing a fully retrieved container oriented in the transport position.
Figure 9:
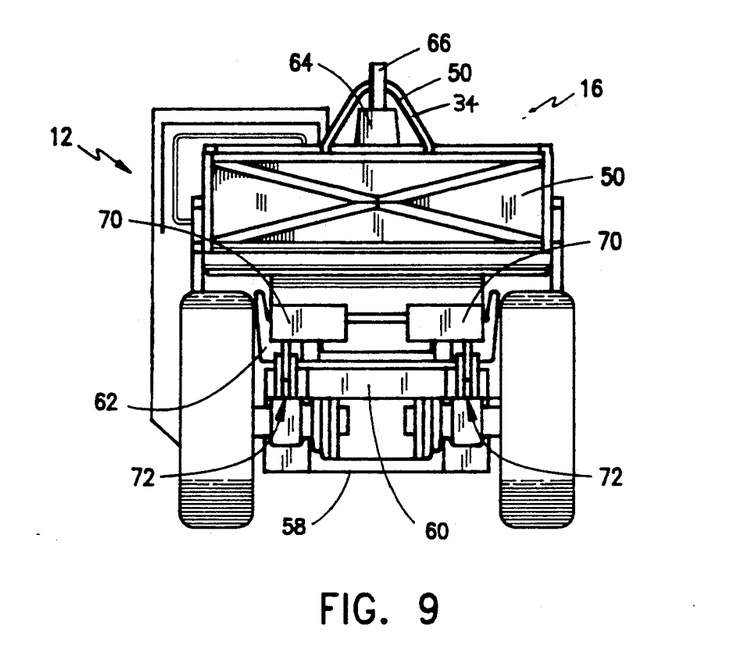
FIG. 9 is an end view in elevation of the material handling apparatus shown in FIG. 8.

It should be understood and appreciated that removal of container 16 from trailer vehicle 14 is accomplished by reversing movement of lift arm 64 so that is moves to the position shown in FIG. 8 from the retracted position shown in FIG. 8 back to the fully extended position shown in FIG. 5. Further, in order to facilitate the removal and retrieval of container 16, it may be seen in FIG. 9 that the trailing portion 58 may include a pair of rollers 70 over which bottom wall 26 of container 16 may travel during the loading and unloading of container 16. As noted above, tiltable bed 62 is pivotally attached to support frame 60 at trailing edge 58. Thus, as is shown in FIG. 9, it may be seen that a pair of hinges 72 accomplish this pivotal attachment.

Figure 10:
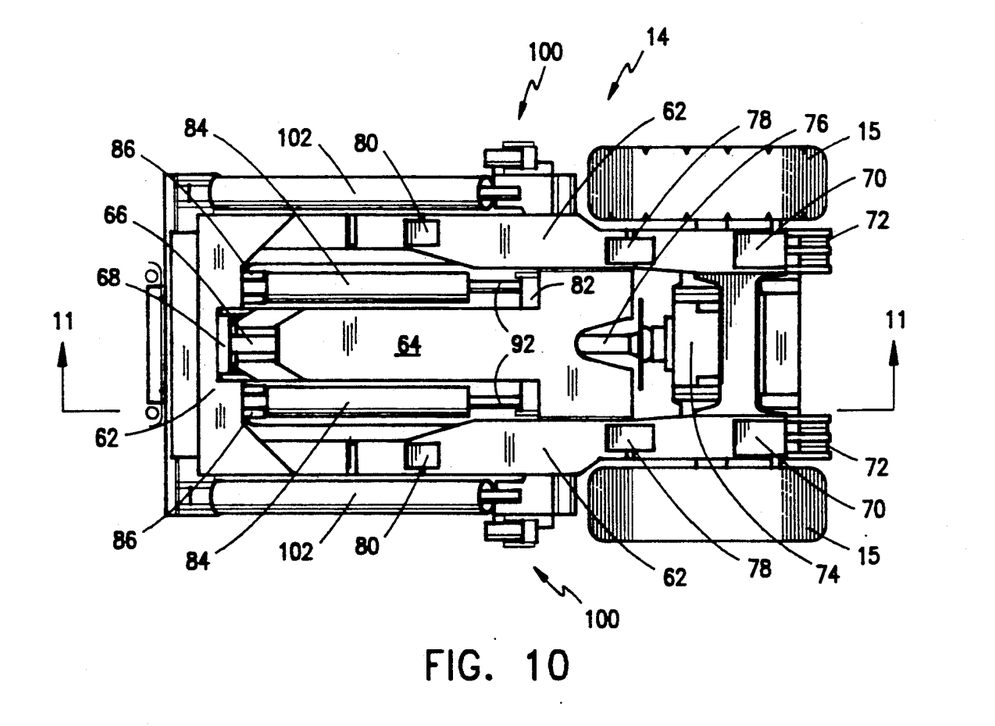
FIG. 10 is a top plan view of the trailer section of the material handling apparatus, without a container supported thereon, for the material handling apparatus of FIGS. 8 and 9.
Figure 11:
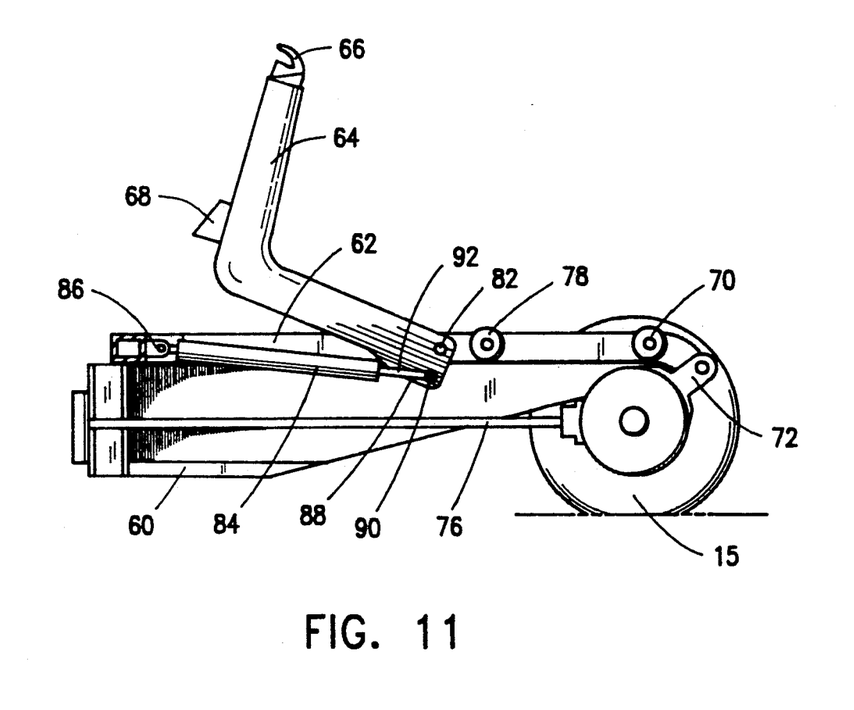
FIG. 11 is a side view in cross-section taken about lines 11—11 of FIG. 10.
Figure 12:
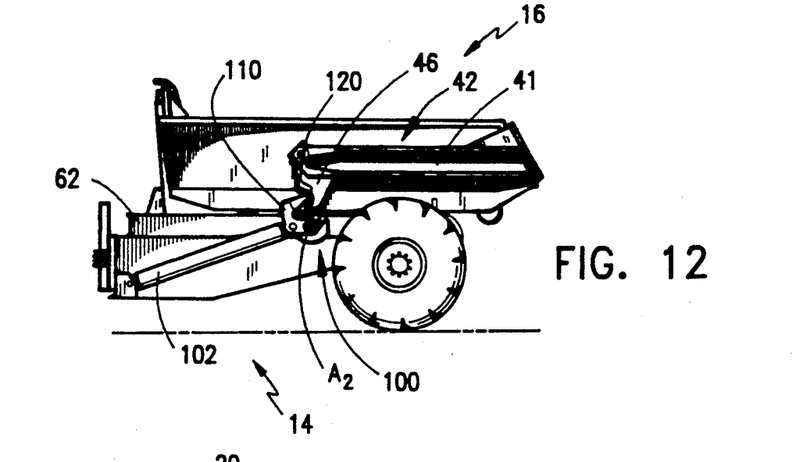
FIG. 12 is a side view in elevation, similar to FIG. 8, but showing the cam assembly of the trailer apparatus advanced into in a contact position with the bell crank arms for the tailgate assembly of the container according to the present invention.

As is shown in FIG. 10 and 11, trailer vehicle 14 has a support frame 60 onto which is secured a tiltable bed 62 by means of the hinges 72. Wheels 15 are mounted on an axle and a differential gear box assembly 74 that is driven by drive shaft 76. A first set of rollers 70 is provided at the trailing portion of trailer vehicle 14, and rollers 70 are rotatably journaled on bed 62 in order to help remove and retrieve container 16, as described above. Further, to assist the longitudinal movement of a container 16 along bed 62, additional roller pairs 78 and 80 are rotatably journaled on bed 62. Bed 62 also mounts cam assemblies 100, the operation of which is described in greater detail below. Cam or linkage assemblies 100 are driven by actuator means in the form of hydraulic cylinders 102, again as described below.

Life arm 64 is centrally located with respect to support frame 60 and trailer vehicle 14 and is pivotally mounted to support frame 60 by means of a lift arm axle 82. Hydraulic cylinders 84 have first ends pivotally mounted to frame 60 by means of hinges 86 and second ends attached to a bell crank portion 88 of lift arm 64 by rotatable mounts 90. Hydraulic cylinders 84 include extendible piston rods 92 so that, due to the expansion and contraction of hydraulic cylinders 84, as is known in the art, lift arm 64 will be moved respectively between the extended and retracted positions.

FIGS. 12-15 show the dumping operation for the material handling apparatus 10 according to the exemplary embodiment of the present invention. Here, it may be seen that tiltable bed 62, along with container 16 secured thereto, may be moved from the transport position, shown in FIG. 12, to the dump position shown in FIG. 15. Reference again is also made to FIG. 8 where it may be appreciated that cylinder 102 is pivotally mounted by hinge 104 to support frame 60, at one end, and includes a slideable piston mounted to linkage assembly 100 at an end opposite hinge 104. Linkage assembly 100 has a link or cam member 110 which is C-shaped in cross-section and has first leg portion 112 which is rotatably journaled, on a cam axis $A_2$ to tiltable bed 62. A central cam portion 116 interconnects first leg portion 112 with a second leg portion 118 which terminates in a free attack end 120.

Figure 13:
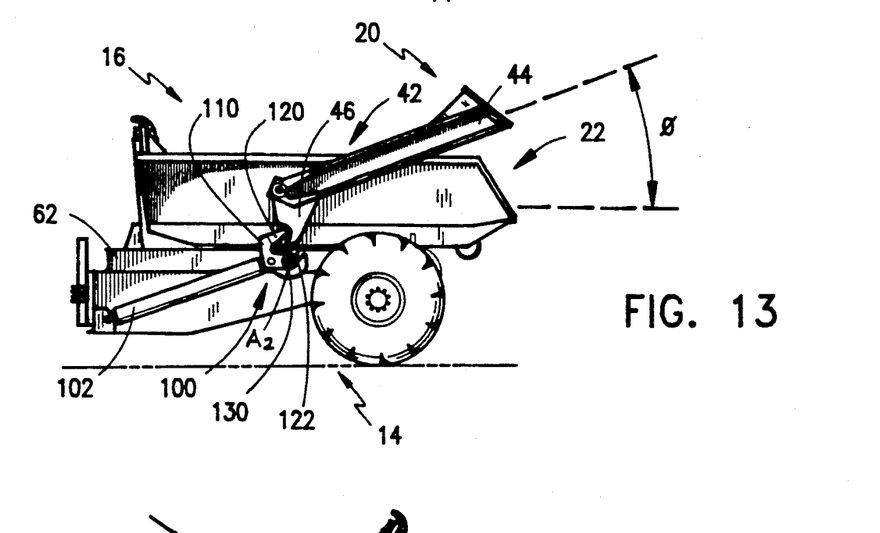
FIG. 13 is a side view in elevation, similar to FIG. 12, but showing a position of continued advancement of the cam assembly whereby the tailgate is moved into the open position.
Figure 15:
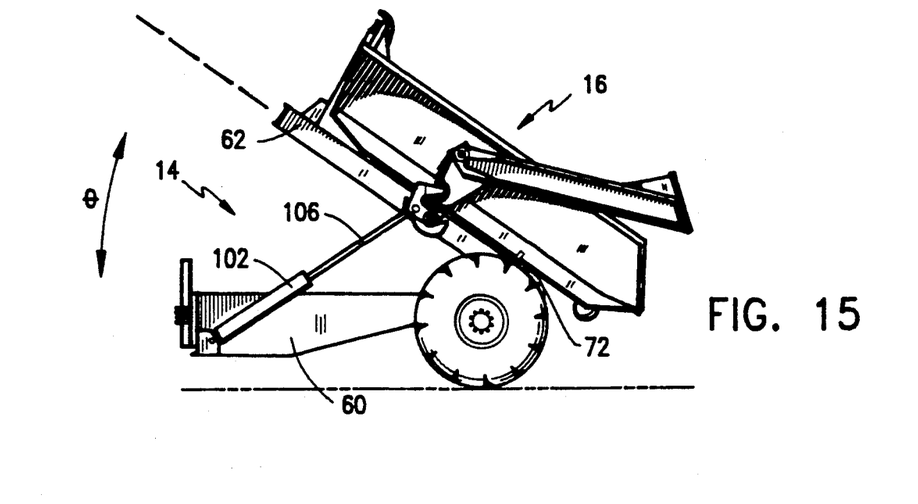
FIG. 15 is a side view in elevation similar to FIGS. 8, 12 and 13 but showing further extension wherein the tiltable bed and the container are moved into the dump position.

In the transport position shown in FIG. 8, it may be seen that attack portion 120 does not bear against a second arm portion 46 of bell crank arm 42. However, with references to FIGS. 12-15, it may be seen that hydraulic cylinders 102 provide actuator means for both moving tail gate assembly 20 into the open position and for moving tiltable bed 62 into the dump position. To this end, it may be seen in FIG. 12 that, as hydraulic cylinder 102 expands to extend piston rod 106, cam member 110 is rotated so that attack portion 120 contacts second arm portion 46 of bell crank arm 42. Further expansion of hydraulic cylinder 102 forces tail gate assembly 20 to move into the open position, as shown in FIG. 13 due to the linkage action of attack portion 120 of cam member 110 on second arm portion 46. Movement of tailgate assembly 20 into the open position continues until foot 122 of C-shaped cam member 110 contacts limit stop block 130 at which time cam member 110 becomes locked against further rotation. In this open position, tailgate assembly 20 is at an angle 0 of about twenty to forty degrees with respect to the plane of edge 36 of container 16. With reference to FIG. 15, it may be seen that continued expansion of hydraulic cylinder 102 so that its piston shaft 106 is in the fully extended position, tiltable bed 62 is forced into the dump position by rotating bed 62 about hinges 72. Preferably, the angle 0 of elevation of bed 62, with respect to the horizontal, is an acute angle of approximately fifty to seventy degrees.

Figure 14A:
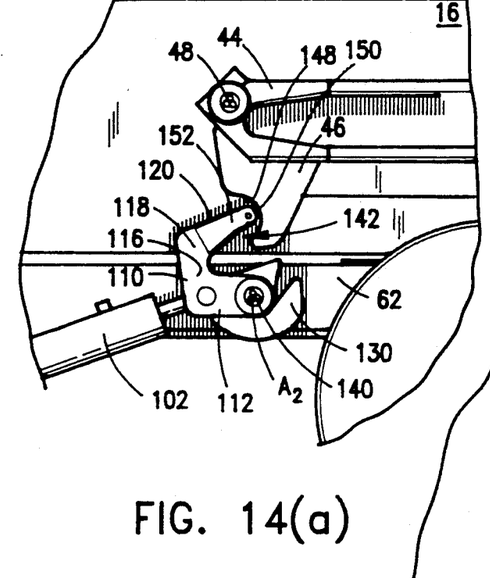
FIGS. 14(a)-14(c) are enlarged views of the cam assembly and bell crank second arm portions showing the positions, respectively, of FIGS. 8, 12 and 13.
Figure 14B:
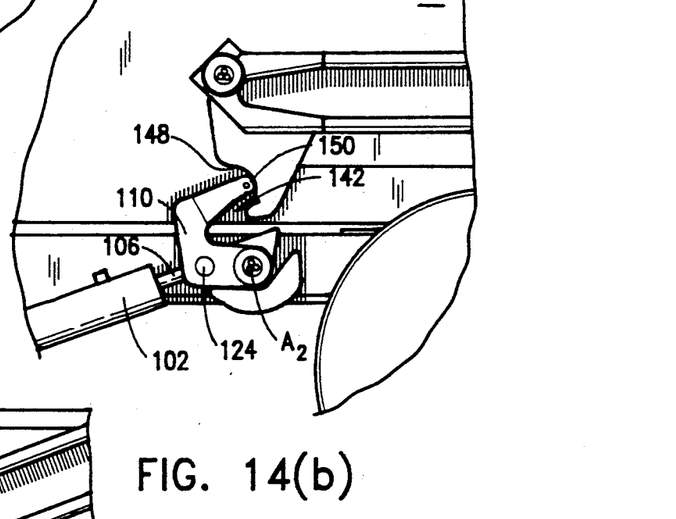
Figure 14C:
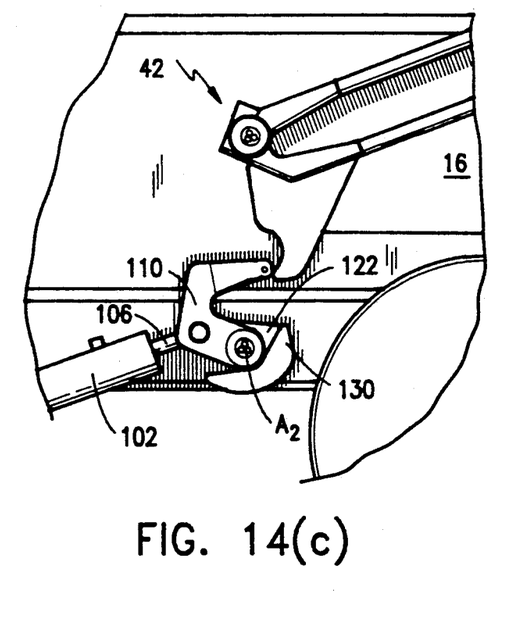

The operation of cam element 110 on second arm portion 46 may be seen with greater detail in FIGS. 14(a)-14(c) which respectively correspond to FIGS. 8, 2, and 13. In FIG. 14(a), it may be seen that, first leg 112 of cam member 110 is rotatably journaled on tiltable bed 62 by suitable trunnions and bearings 140. Central portion 116 interconnects first leg 112 with second leg 118 which is provided with a follower wheel 150 mounted attack portion 120 by means of a pair of brackets 152. Follower wheel 40 is received in recess 146 formed in second arm portion 46 of bell crank arm 42 with recess 146 having an arcuate contact surface 148 against which follower wheel 150 will travel.

Thus, as is shown in FIG. 14(b), when rod 106 is slightly extended, follower wheel 150 contacts arcuate surface 148 of recess 142 due to the ability of cam member 110 to pivot on axel 124, with respect to piston rod 106. Continued extension of piston rod 106 of hydraulic cylinder 102 pivots bell crank arm 42, as is shown in FIG. 14(c), until such time that foot end 122 of cam member 110 contacts a limit stop block 130. Retraction of piston rod 106 counter-rotates cam member 110 until central portion 116 also contacts limit stop block 130, as shown in FIG. 14(a), since limit stop block 130 partially encircles the cam axis $A_2$ defined by trunnion bearing assembly 140. As noted above, and with reference to FIG. 15, full extension of piston rod 106 pivotally drives tiltable bed 62 due to the locking of cam member 110 against limit stop block 130.

From the foregoing description, operation of material handling apparatus 10 according to the exemplary embodiment of the present invention should now be readily understood. In summary, a user may distribute a plurality of containers 16 at various collection sites, such as within an underground mine, so that workers may fill the containers 16 with mine or other material. A single worker may circulate the tractor/trailer apparatus among the various collection sites and, upon such time as encountering a filled container 16, the worker may extend crank arm 64 to engage transverse bar 34 of a container 16, as is shown in FIG. 5. By operating hydraulic cylinders 84 (which are dual action cylinders capable of applying force both in extension and retraction), a container 16 that is filled by material may be retrieved onto trailer vehicle 14. It is specifically disposed on tiltable bed 62 where it is retained in position by lift arm 64 that is received in recess 32 due to the engagement of hook portion 66 with transverse bar 34. The container is then transported to a desired deposit site where the material is dumped by the operation of only hydraulic cylinders 102 which, when extended, first interact with bell crank arm 42 by means of linkage assembly 100 to open tailgate assembly 20 and then elevate tiltable bed 62 to cause material to dump rearwardly out of container 16 through open rear area 22, as shown in FIGS. 2 and 15. Hydraulic cylinders 102 may then be retracted to restore the empty container 16 to the transport position where it may be returned to a collection site and removed by reversing the retrieval operation. This material handling apparatus 10, therefore, reduces capital equipment costs by requiring only a single tractor and trailer combination for a plurality of containers 16 and by its simplified construction. This simplified construction reduces breakdown and maintenance costs and economies are further realized since only one work is required to operate the material handling apparatus 10.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A material handling apparatus adapted to collect material at a collection site, transport the material to a deposit site and dump the material at the deposit site, comprising:
   (a) a transport frame including a support frame and a tiltable bed pivotally connected to said support frame along a bed axis;
   (b) a container associated with said tiltable bed defining a housing structure having a bottom wall, a pair of side walls, a front wall and an open rear area that together form a storage region for receiving said material, said container including a tailgate assembly having a pair of bell crank arms each having first and second arm portions, said bell crank arms pivotally journaled to said housing structure on an arm axis, and a tailgate mounted between said first arm portions whereby said bell crank arms may be pivoted to move said tailgate between a closed position wherein said tailgate extends across and thereby closes the open rear area of said housing structure and an open position wherein said tailgate is moved away from and thereby opens the open rear area of said housing structure;
   (c) a linkage assembly associated with the second arm portion of each said bell crank arm, each said linkage assembly including a cam member rotatably journaled to said tiltable bed on a respective cam axis;
   (d) actuator means for operating said bell crank arms and for tilting said tiltable bed between a transport position for transporting the material and a dump position for dumping the material at the deposit site, said actuator means operative to rotate each side cam member so that an attack portion thereof contacts the second arm portion of a respective bell crank arm whereby rotation of said cam members pivots said bell crank arms to move said tailgate assembly into the open position, said actuator means including first limit stop means for limiting pivotal movement of said second arm portions at a first stop point whereby said actuator means applies force first to rotate said cam members and so that continued application of force by said actuator means causes said tiltable bed to pivot about the bed axis thereby tilting said tiltable bed from the transport position to the dump position so that said container is likewise tilted to dump material in the storage region thereof through the open rear area; and
   (e) means for moving said transport frame between the collection site and the deposit site.

2. A material handling apparatus according to claim 1 wherein said limit stop means comprises a block element associated with each said cam member and attached to said tilting bed at a location such that the respective cam member will rotate into abutment with the associated said block element to define the first limit stop.

3. A material handling apparatus according to claim 2 including second limit stop means for limiting rotation of each said cam member at a second limit stop whereby the respective said cam member may be rotated between said first and second limit stops.

4. A material handling apparatus according to claim 3 wherein said block element extends partially around the respective cam axis to define said second limit stop means.

5. A material handling apparatus according to claim 1 wherein each said cam member is C-shaped in configuration and has a first cam leg rotatably journaled to said support frame, a second cam leg having a free end defining said attack portion and a central cam portion interconnecting said first and second cam legs.

6. A material handling apparatus according to claim 5 including a follower wheel on the free end of each said second cam leg, each said follower wheel operative to contact the second arm portion of the respective said bell crank arm.

7. A material handling apparatus according to claim 6 wherein each said second arm portion has an arcuate recess formed therein, each of the arcuate recesses oriented to engage the respective follower wheel of the associated cam member and having an arcuate contact surface forming a race for the respective follower wheel.

8. A material handling apparatus according to claim 1 wherein said actuator means includes a pair of hydraulic cylinders each interconnected between said support frame and one of said cam members whereby expansion and contraction of said hydraulic cylinders acts to rotate the respective cam member in opposite angular directions.

9. A material handling apparatus adapted to collect material at a collection site, transport the material to a deposit site and dump the material at the deposit site, comprising:
   (a) a transport frame including a support frame and a tiltable bed pivotally connected to said support frame along a bed axis;
   (b) a demountable container defining a housing structure having a bottom wall, a pair of side walls, a front wall and an open rear area that together form a storage region for receiving said material, said container including a tailgate gate assembly having a pair of bell crank arms each having first and second arm portions, said bell crank arms pivotally journaled to said housing structure on an arm axis, and a tailgate mounted between said first arm portions whereby said bell crank arms may be pivoted to move said tailgate between a closed position wherein said tailgate extends across and thereby closes the open rear area of said housing structure and an open position wherein said tailgate is moved away from and thereby opens the open rear area of said housing structure;
   (c) lift means associated with said transport frame for depositing said container at the collection site, for retrieving said container from the collection site and for positioning said container on said tiltable bed;

(d) actuator means for operating said bell crank arms and for tilting said tiltable bed between a transport position for transporting the material and a dump position for dumping the material at the deposit site, said lift means operative when positioning said container on said tiltable bed to orient said second arm portions at a location with respect to said actuator means so that said actuator means applies force to the second arm portion of each said bell crank arm to pivot said bell crank arms about the arm axis thereby moving said tailgate into the open position, said actuator means including first limit stop means for limiting pivotal movement of said second arm portions at a first stop point when said tailgate is in the open position whereby continued application of force by said actuator means causes said tiltable bed to pivot about the bed axis thereby tilting said tiltable bed from the transport position to the dump position so that said container is likewise tilted to dump material in the interior thereof through the open rear area while being held in position by said lift arm; and (e) means for moving said transport frame between the collection site and the deposit site.

10. A material handling apparatus according to claim 9 wherein said lift means includes a lift arm pivotally journaled to said tiltable bed and having a free end terminating in a hook portion, and a second actuator means for interconnecting said lift arm and said tiltable frame and for advancing said lift arm between a retracted position and an extended position, said container having means for engaging said hook portion in the extended position whereby, after engagement, retraction of said lift arm toward the retracted position operates to lift said container up and onto said tiltable bed.

11. A material handling apparatus according to claim 10 wherein said container includes at least one support wheel operative to support a trailing portion of said container when said container is being retrieved.

12. A material handling apparatus according to claim 10 wherein said means for engaging including a transverse bar at a leading portion of said container.

13. A material handling apparatus according to claim 10 wherein said container includes a lift arm recess adapted to receive said lift arm when in the transport position.

14. A material handling apparatus according to claim 10 wherein said lift arm is operative to hold said container on said tiltable bed when said tiltable bed is moved into the dump position.

15. A material handling apparatus according to claim 10 wherein said second actuator means comprises a hydraulic cylinder assembly.

16. A material handling apparatus according to claim 15 wherein said hydraulic cylinder assembly is dual acting so as to positively move said lift arm in both directions between said extended and retracted positions.

17. A material handling apparatus according to claim 16 wherein said transport frame comprises a trailer vehicle and including a tractor vehicle operative to move said trailer vehicle between said collection and deposit points.

18. A material handling apparatus adapted to receive material at a collection site, transport the material to a deposit site and dump the material at the deposit site, comprising:

(a) a container having a bottom wall, a pair of side walls and a front wall defining a housing having an interior for receiving material to be transported and having a rear opening, said container including a transverse bar attached to said housing and disposed forwardly thereof, a pair of bell crank arms each pivotally mounted on an arm axis to a respective sidewall and having an elongated first arm portion extending rearwardly from the arm axis to terminate at a distal end proximate the rear opening of said housing and having a second arm portion extending downwardly from the arm axis, and a tailgate mounted between the distal ends of said first arm portions whereby said bell crank arms may be pivoted to move said tailgate between a closed position wherein said tailgate extends across and thereby closes the rear opening of said housing structure and an open position wherein said tailgate is moved away from and thereby opens the rear opening of said housing;

(b) a transport vehicle having a tractor section and a trailer section and being adapted to deposit and retrieve said container at the collection site, to transport said container between the collection and the deposit sites and to dump material out of said container at the deposit site, and trailer section including a support frame having a front portion, a central portion and a back portion, a tiltable bed connected to the back portion of said support frame along a transverse bed axis, a pair of cam members rotatably journaled centrally of said tiltable bed on a cam axis and disposed on either side thereof, first limit stop means associated with each said cam members for limiting rotation thereof at a first stop point, a pair of first hydraulic actuator cylinders disposed on either side of said tiltable bed, each actuator cylinder secured at one end to the front portion of said support framd and at another end to a respective cam member, a lift arm povitally journaled to said tiltable bed and having a free end terminating in a hook portion, and a second hydraulic actuator cylinder interconnecting said lift arm and said tiltable frame and operative to advance said lift arm between a retracted position and an extended position;

(c) said lift arm operative to retrieve said container from the collection site by engaging said transverse bar with the hook portion thereof when in the extended position so that, when said lift arm is moved toward the retracted position, said container is pulled onto said tiltable bed and held in the transport position with the second arm portions of said bell crank each located proximate a respective said cam member, and said lift arm operative to deposit said container at the collection site by advacing from the retracted position toward the extend position thereby sliding said container rearwardly off of said tiltable bed; and (d) said first actuator cylinders operative to dump material from said container when said container is held in the transport position by said lift arm, said first actuator cylinders first applying force to advance said cam members against said second arm portions whereby said tailgate is moved from the closed position to the open position until said cam members reach the stop point whereby continued application of force by said first actuator cylinders causes said tiltable bed to pivot about the bed axis thereby tilting said tiltable bed from the transport portion to the dump position so that said container is likewise tilted to dump material in the interior thereof through the rear opening.

19. A material handling apparatus according to claim 18 wherein said first limit stop means comprises a block element associated with each said cam member and attached to said support frame at a location such that the respective cam member will rotate into abutment with the associated said block element to define the first limit stop.

20. A material handling apparatus according to claim 19 including second limit stop means for limiting rotation of each said cam member at a second limit stop whereby the resepctive said cam member may be rotated between said first and second limit stops.

21. A material handling apparatus according to claim 20 wherein said block element extends partially around the respective cam axis to define said second limit stop means.

22. A material handling apparatus according to claim 19 wherein each said cam member is C-shaped in configuration and has a first cam leg rotatably journaled to said support frame, a second cam leg having a free end defining said attack portion and a central cam portion interconnecting said first and second cam legs.

23. A material handling apparatus according to claim 22 including a follower wheel on the free end of each said second cam leg, each said follower wheel operative to contact the second arm portion of a respective said bell crank arm.

24. A materiall handling apparatus according to claim 23 wherein each said second arm portions has an arcuate recess formed therein, each of the arcuate recesses oriented to engage the respective follower wheel of the associated cam member and having an arcuate contact surface forming a race for the respective follower wheel.

25. A material handling apparatus according to claim 18 wherein said container includes at least one support wheel operative to support a trailing portion of said container when said container is being retrieved.

26. A material handling apparatus according to claim 18 wherein said second hydraulic actuator cylinder is dual acting so as to positively move said lift arm in both directions between said extended and retracted positions.

* * * * *